(12) United States Patent
Sugiura et al.

(10) Patent No.: US 11,667,027 B2
(45) Date of Patent: Jun. 6, 2023

(54) WORKING MACHINE

(71) Applicant: MAKITA CORPORATION, Anjo (JP)

(72) Inventors: Hideaki Sugiura, Anjo (JP); Toshikazu Migita, Anjo (JP)

(73) Assignee: MAKITA CORPORATION, Anjo (JP)

(*) Notice: Subject to any disclaimer, the term of this patent is extended or adjusted under 35 U.S.C. 154(b) by 48 days.

(21) Appl. No.: 17/453,564

(22) Filed: Nov. 4, 2021

(65) Prior Publication Data

US 2022/0161411 A1 May 26, 2022

(30) Foreign Application Priority Data

Nov. 26, 2020 (JP) .............................. JP2020-195867

(51) Int. Cl.
*B25F 5/02* (2006.01)
*A01G 3/04* (2006.01)
*A01G 3/053* (2006.01)

(52) U.S. Cl.
CPC ............... *B25F 5/02* (2013.01); *A01G 3/053* (2013.01); *A01G 2003/0461* (2013.01)

(58) Field of Classification Search
CPC ... B25F 5/02; A01G 3/053; A01G 2003/0461; F16C 3/03; B25G 1/04
USPC ........................................................ 173/170
See application file for complete search history.

(56) References Cited

U.S. PATENT DOCUMENTS

| 4,010,806 | A | * | 3/1977 | Broadbent | ............ E21B 19/086 |
| | | | | | 173/199 |
| 4,122,601 | A | * | 10/1978 | Katsuya | .................. A01D 34/90 |
| | | | | | 30/298.4 |
| 4,505,040 | A | * | 3/1985 | Everts | ........................ B25F 3/00 |
| | | | | | 30/296.1 |
| 4,654,971 | A | * | 4/1987 | Fettes | ................. B27B 17/0008 |
| | | | | | 30/296.1 |
| 5,013,282 | A | * | 5/1991 | Keller | ..................... B27B 17/08 |
| | | | | | 464/178 |
| RE34,358 | E | * | 8/1993 | Miller | .................... A01G 3/037 |
| | | | | | 30/296.1 |
| 5,261,162 | A | * | 11/1993 | Siegler | ................... A01G 3/053 |
| | | | | | 30/223 |

(Continued)

FOREIGN PATENT DOCUMENTS

JP 2013-005729 A 1/2013

*Primary Examiner* — Dariush Seif
(74) *Attorney, Agent, or Firm* — Sughrue Mion, PLLC (57) ABSTRACT

A working machine may include a pipe including: an outer pipe; an inner pipe inserted in the outer pipe; a pipe holder fixed to the outer pipe; and a stopper disposed inside the outer pipe. The pipe holder includes a wall part. The inner pipe includes a fixing hole having a longitudinal direction in a circumferential direction of an outer circumferential surface of the inner pipe. A rear surface of the fixing hole has a shape extending along a plane orthogonal to a front-rear direction. The stopper includes: an abutting part that abuts the wall part from behind when the inner pipe extends to a maximum length relative to the outer pipe; and a protruding part configured to fit in the fixing hole of the inner pipe. A rear surface of the protruding part has a shape extending along a plane parallel to the rear surface of the fixing hole.

9 Claims, 7 Drawing Sheets

(56) References Cited

U.S. PATENT DOCUMENTS

| | | | |
|---|---|---|---|
| 5,787,590 A * | 8/1998 | D'Alessandro, Sr. ......... A01G 3/0417 30/296.1 |
| 5,819,418 A * | 10/1998 | Uhl ................ A01G 3/08 30/296.1 |
| 5,926,961 A * | 7/1999 | Uhl ................ B27B 17/0008 30/296.1 |
| 5,933,965 A * | 8/1999 | Linden .............. A01G 3/0255 30/249 |
| 6,099,036 A * | 8/2000 | Fujiu ................ F16C 3/03 280/777 |
| 6,182,367 B1 * | 2/2001 | Janczak .............. A01G 3/053 30/296.1 |
| 6,240,642 B1 * | 6/2001 | Templeton ............. A01G 3/08 30/162 |
| 7,258,261 B1 * | 8/2007 | Reyes ................ B25C 7/00 227/156 |
| 7,574,806 B2 * | 8/2009 | Wang ................ B25G 1/04 33/483 |
| 7,802,509 B2 * | 9/2010 | Wall ................ F42D 1/14 89/1.14 |
| 9,247,856 B2 * | 2/2016 | Colangelo .............. B25G 3/38 |
| 9,764,458 B1 * | 9/2017 | Resh ................ B25G 1/04 |
| 9,897,135 B2 * | 2/2018 | Miyakawa ............. F16C 3/035 |
| 10,670,070 B2 * | 6/2020 | Weissert ................ F16C 1/08 |
| 10,960,528 B1 * | 3/2021 | Velez ................ B08B 1/002 |
| 2005/0097691 A1 * | 5/2005 | Tsuchiya ............. A47L 13/42 15/144.4 |
| 2006/0048397 A1 * | 3/2006 | King ................ B25F 5/02 30/296.1 |
| 2007/0261253 A1 * | 11/2007 | Marley .............. A01G 3/053 30/216 |
| 2008/0173138 A1 * | 7/2008 | Dayton .............. A01G 3/053 30/500 |
| 2009/0119933 A1 * | 5/2009 | Mace ................ B23D 57/023 30/277.4 |
| 2010/0126300 A1 * | 5/2010 | Tokioka .............. B62D 1/185 464/172 |
| 2013/0326832 A1 * | 12/2013 | Resh ................ B25G 1/04 81/489 |
| 2014/0143984 A1 * | 5/2014 | Andel ................ B25G 1/04 16/429 |
| 2015/0129273 A1 * | 5/2015 | Miyakawa ............. A01G 3/085 173/213 |
| 2017/0273239 A1 * | 9/2017 | Ota ................ A01D 34/68 |
| 2019/0162241 A1 * | 5/2019 | Sekiguchi ............. F16D 3/12 |
| 2019/0232456 A1 * | 8/2019 | Sugita ................ B24B 47/12 |
| 2019/0240827 A1 * | 8/2019 | Menzel ............. A01G 3/053 |
| 2019/0277333 A1 * | 9/2019 | Moriyama ............. B62D 1/16 |
| 2020/0187633 A1 * | 6/2020 | Paratore ............. A46B 5/0095 |
| 2020/0291909 A1 * | 9/2020 | Banholzer .............. F16N 1/00 |
| 2020/0338711 A1 * | 10/2020 | Banholzer .............. F16C 3/03 |
| 2020/0378445 A1 * | 12/2020 | Moriyama ............. B62D 1/20 |
| 2022/0266442 A1 * | 8/2022 | Jungklaus ............. B25G 1/04 |
| 2022/0362922 A1 * | 11/2022 | Tata ................ B25G 1/04 |

* cited by examiner

WORKING MACHINE

CROSS-REFERENCE TO RELATED APPLICATION

This application claims priority to Japanese Patent Application No. 2020-195867 filed on Nov. 26, 2020, the entire contents of which are hereby incorporated by reference into the present application.

TECHNICAL FIELD

The disclosure herein relates to a working machine.

BACKGROUND

Japanese Patent Application Publication No. 2013-5729 describes a working machine. The working machine comprises a telescopic pipe configured to adjust its length in a front-rear direction, a front end unit attached to a front end of the pipe and including a working part, a rear end unit attached to a rear end of the pipe, and a prime mover configured to drive the working part. The telescopic pipe comprises an outer pipe, an inner pipe inserted in the outer pipe, a pipe holder fixed to the outer pipe, and a stopper disposed inside the outer pipe. The pipe holder comprises a wall part extending inward in a radial direction with respect to an inner circumferential surface of the outer pipe. The inner pipe includes a fixing hole penetrating the inner pipe from an outer circumferential surface to an inner circumferential surface of the inner pipe. The stopper comprises an abutting part disposed rearward with respect to the wall part and configured to abut the wall part from behind when the telescopic pipe extends to a maximum length, and a penetrating hole that penetrates the stopper in a thickness direction. The stopper is fixed to the inner pipe by having a rivet inserted into the fixing hole of the inner pipe and the penetrating hole of the stopper.

SUMMARY

With the configuration of JP 2013-5729 A, when the abutting part of the stopper abuts the wall part of the pipe holder as a result of having extended the pipe to its maximum length, the rivet is moved relatively rearward with respect to the inner pipe and thus is pressed against the inner pipe. With the above configuration, since the rivet has a round columnar shape, force applied to the rivet is concentrated at a certain point of the rivet. When the abutting part of the stopper abuts the wall part of the pipe holder repeatedly as a result of extension and retraction of the telescopic pipe, the rivet could be damaged and the stopper may no longer be fixed to the inner pipe. The description herein discloses an art configured to enable fixation of a stopper to an inner pipe even when extension and retraction of a pipe are repeated.

A working machine disclosed herein may comprise a telescopic pipe configured to adjust its length in a front-rear direction; a front end unit attached to a front end of the pipe and including a working part; a rear end unit attached to a rear end of the pipe; and a prime mover configured to drive the working part, wherein the pipe comprises: an outer pipe; an inner pipe inserted in the outer pipe; a pipe holder fixed to the outer pipe; and a stopper disposed inside the outer pipe, the pipe holder comprises a wall part extending inward in a radial direction with respect to an inner circumferential surface of the outer pipe, the inner pipe includes a fixing hole having a longitudinal direction in a circumferential direction of an outer circumferential surface of the inner pipe, a rear surface of the fixing hole has a shape extending along a plane orthogonal to the front-rear direction, the stopper comprises: an abutting part disposed rearward with respect to the wall part and configured to abut the wall part from behind when the inner pipe extends to a maximum length relative to the outer pipe; and a protruding part extending inward in the radial direction from outside with respect to the outer circumferential surface of the inner pipe and configured to fit in the fixing hole of the inner pipe, and a rear surface of the protruding part has a shape extending along a plane parallel to the rear surface of the fixing hole.

According to the above configuration, when the inner pipe extends to the maximum length relative to the outer pipe and the abutting part of the stopper thereby abuts the wall part of the pipe holder, the protruding part moves rearward relative to the inner pipe and thus the rear surface of the protruding part is pressed against the rear surface of the fixing hole. Since the rear surface of the protruding part has the shape extending along the plane parallel to the rear surface of the fixing hole, the rear surface of the protruding part abuts the inner pipe in surface contact. Due to this, force applied to the protruding part does not concentrate at a certain point of the rear surface of the protruding part but is rather distributed over an entirety of the rear surface of the protruding part. Due to this, even when the abutting part repeatedly abuts the wall part as a result of extension and retraction of the pipe, the protruding part can be suppressed from being damaged, and fixation of the stopper to the inner pipe can be ensured.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more aspects of the present teachings, a length of the protruding part in the circumferential direction on an inner circumferential surface of the inner pipe may range from twenty percent to fifty percent of an entire circumference of the inner circumferential surface of the inner pipe.

If the length of the protruding part in the circumferential direction is less than 20% of the entire circumference of the inner circumferential surface of the inner pipe, strength of the protruding part might be insufficient such that the protruding part may be damaged when the abutting part repeatedly abuts the wall part, as a result of which the stopper might become incapable of being fixed to the inner pipe. Further, if the length of the protruding part in the circumferential direction is more than 50% of the entire circumference of the inner circumferential surface of the inner pipe, the fixing hole must be designed to correspond to the length of the protruding part, as a result of which strength of the inner pipe might become insufficient. According to the above configuration, the stopper becoming incapable of being fixed to the inner pipe due to the protruding part being damaged can be suppressed, and the strength of the inner pipe can be suppressed from being insufficient.

In one or more aspects of the present teachings, the fixing hole may penetrate the inner pipe from the outer circumferential surface to an inner circumferential surface of the inner pipe, and in a state of fitting in the fixing hole, the protruding part may extend inward in the radial direction with respect to the inner circumferential surface of the inner pipe.

According to the above configuration, a contacting area where the protruding part contacts the inner pipe can be increased as compared to a case where the protruding part does not extend inward in the radial direction with respect to the inner circumferential surface of the inner pipe. Due to this, force applied to the protruding part can further be distributed. Even if the abutting part repeatedly abuts the wall part, the protruding part can be suppressed from being damaged and the stopper can be ensured to be fixed to the inner pipe.

In one or more aspects of the present teachings, the protruding part may comprise at least two protruding parts, and two of the at least two protruding parts may be disposed at symmetrical positions with respect to a center axis of the inner pipe when viewed in the plane orthogonal to the front-rear direction.

According to the above configuration, when the abutting part abuts the wall part with the inner pipe extended to its maximum length relative to the outer pipe, the force is applied uniformly over the two protruding parts rather than excessive force being applied to only one of the two protruding parts. Due to this, even if the abutting part repeatedly abuts the wall part, the protruding part can be suppressed from being damaged and the stopper can be ensured to be fixed to the inner pipe.

In one or more aspects of the present teachings, the stopper may cover a rear end surface of the inner pipe.

In general, another member such as a power cable may be disposed inside the telescopic pipe. According to the above configuration, with the stopper covering the rear end surface of the inner pipe, this other member such as an electric cable can be suppressed from contacting and being damaged by the rear end surface of the inner pipe.

In one or more aspects of the present teachings, a length of the protruding part in the radial direction may range from twenty-five percent to forty-five percent of a length of the protruding part in the front-rear direction.

According to the above configuration, a size of the stopper can be suppressed from becoming large-sized accompanying a size increase of the protruding part while the strength of the protruding part is ensured.

In one or more aspects of the present teachings, the prime mover may comprise a motor.

When the prime mover is an engine, the telescopic pipe vibrates due to vibration of the engine. If the telescopic pipe vibrates in the state where the inner pipe is extended to its maximum length relative to the outer pipe and the abutting part is abutting the wall part, large force continues to be applied to the protruding part, as a result of which the protruding part might thereby be damaged. According to the above configuration, the vibration of the telescopic pipe is suppressed as compared to the case where the prime mover is an engine. Even if the telescopic pipe vibrates while the abutting part abuts the wall part, the large force continuing to be applied to the protruding part can be suppressed from occurring. Due to this, the protruding part can be suppressed from being damaged, and fixation of the stopper to the inner pipe can be ensured.

In one or more aspects of the present teachings, the working machine may further comprise a battery pack configured to be detachably attached to the rear end unit, wherein the motor may be configured to be driven by power supplied from the battery pack.

With a configuration in which the working machine supplies power to the motor from an external power source through a power cable, the power cable could hinder work that is to be performed. According to the above configuration, workability in using the working machine can be improved.

Embodiment

Figure 1:
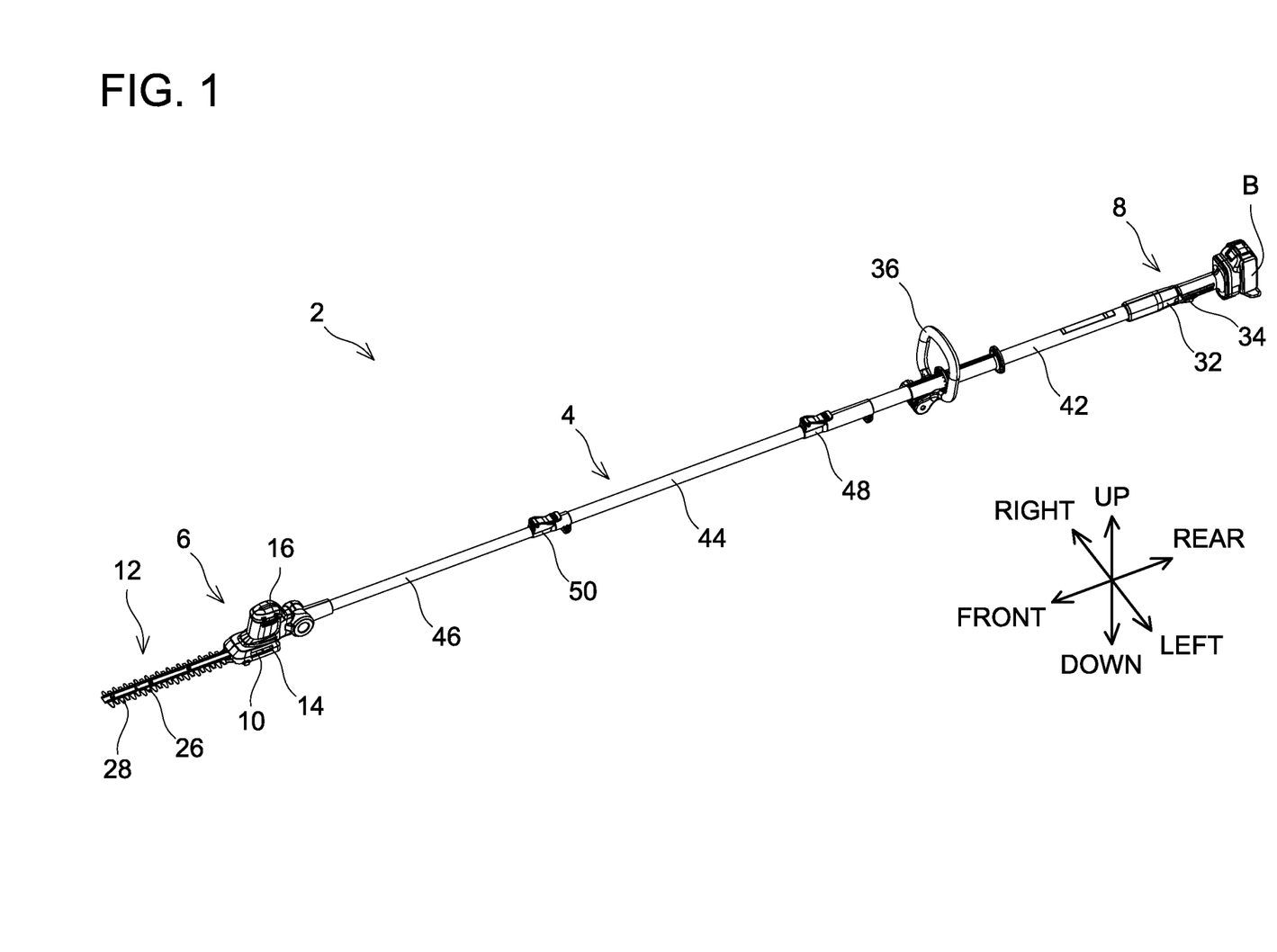
FIG. 1 is a perspective view of a working machine 2 of an embodiment.

A working machine 2 of an embodiment will be described with reference to FIGS. 1 to 8. The working machine 2 is a motored working machine for gardening. As shown in FIG. 1, in the present embodiment, the working machine 2 is a pole hedge trimmer. The working machine 2 is used in pruning branches in higher spaces. In the description below, a longitudinal direction of the working machine 2 will be termed a front-rear direction, a direction orthogonal to the front-rear direction will be termed an up-down direction, and a direction orthogonal to the front-rear direction and to the up-down direction will be termed a left-right direction.

The working machine 2 comprises a telescopic pipe 4, a front end unit 6, and a rear end unit 8. The telescopic pipe 4 is configured to adjust its length in the front-rear direction.

Figure 2:
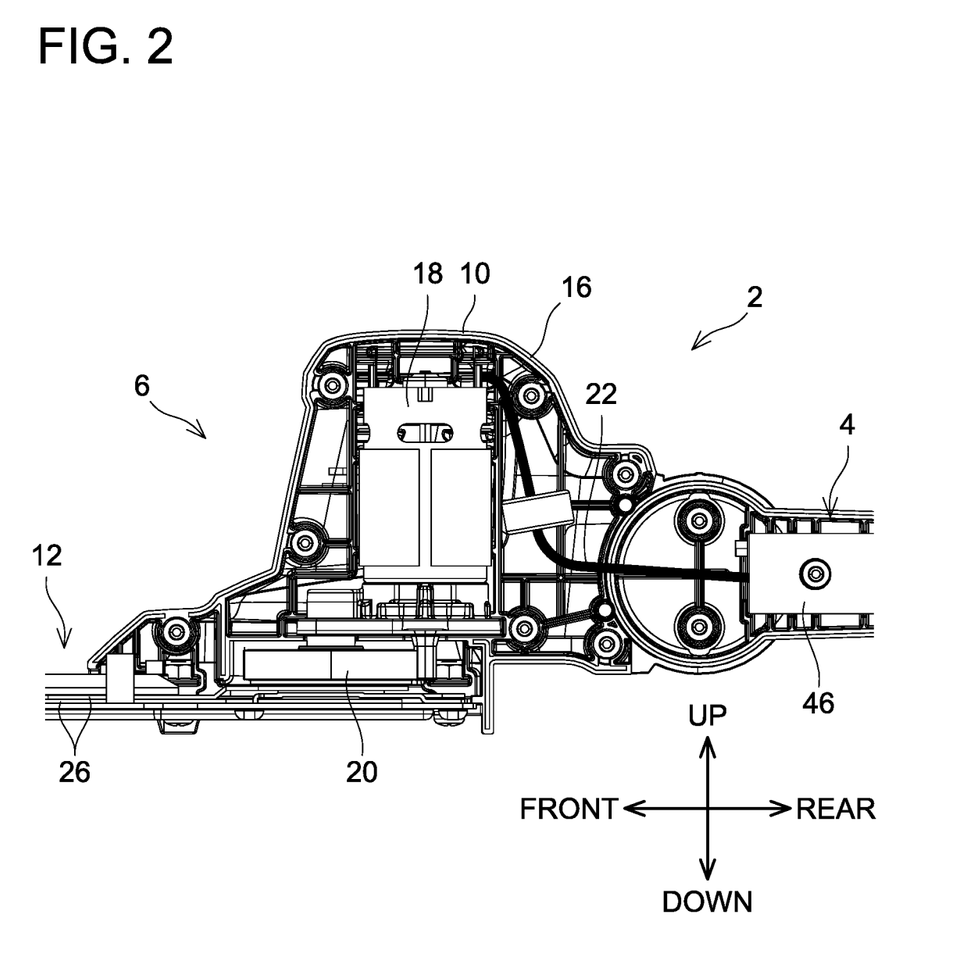
FIG. 2 is a left side view seeing a vicinity of a front end unit 6 of the working machine 2 of the embodiment from a left side with a left front end housing 14 detached.

The front end unit 6 comprises a front end housing 10 and a working part 12. The front end housing 10 is attached to a front end of the telescopic pipe 4. The front end housing 10 comprises a left front end housing 14 defining an outer shape of a left half of the front end housing 10 and a right front end housing 16 defining an outer shape of a right half of the front end housing 10. As shown in FIG. 2, a motor 18 and a power conversion mechanism 20 are disposed within the front end housing 10. The motor 18 may for example be a brushless motor. The motor 18 is configured to rotate by power supplied from a battery pack B (see FIG. 1) through a power cable 22. The power conversion mechanism 20 is connected to a lower end of the motor 18. The power conversion mechanism 20 is configured to convert rotary motion of the motor 18 to linear motion of the working part 12 in the front-rear direction. Since the configuration of the power conversion mechanism 20 for hedge trimmers is well known, thus its detailed description will be omitted.

The working part 12 comprises a pair of cutter blades 26. The pair of cutter blades 26 extends in the front-rear direction. The pair of cutter blades 26 overlap each other in the up-down direction. The pair of cutter blades 26 is connected to the power conversion mechanism 20. When the motor 18 rotates, the pair of cutter blades 26 receives power converted by the power conversion mechanism 20 and reciprocates in an inverse phase in the front-rear direction. Specifically, when one of the cutter blades 26 moves forward, the other of the cutter blades 26 moves rearward, and when the one of the cutter blades 26 moves rearward, the other of the cutter blades 26 moves forward. The pair of cutter blades 26 has a plurality of blade edges 28 (see FIG. 1) arranged along the front-rear direction.

Figure 3:
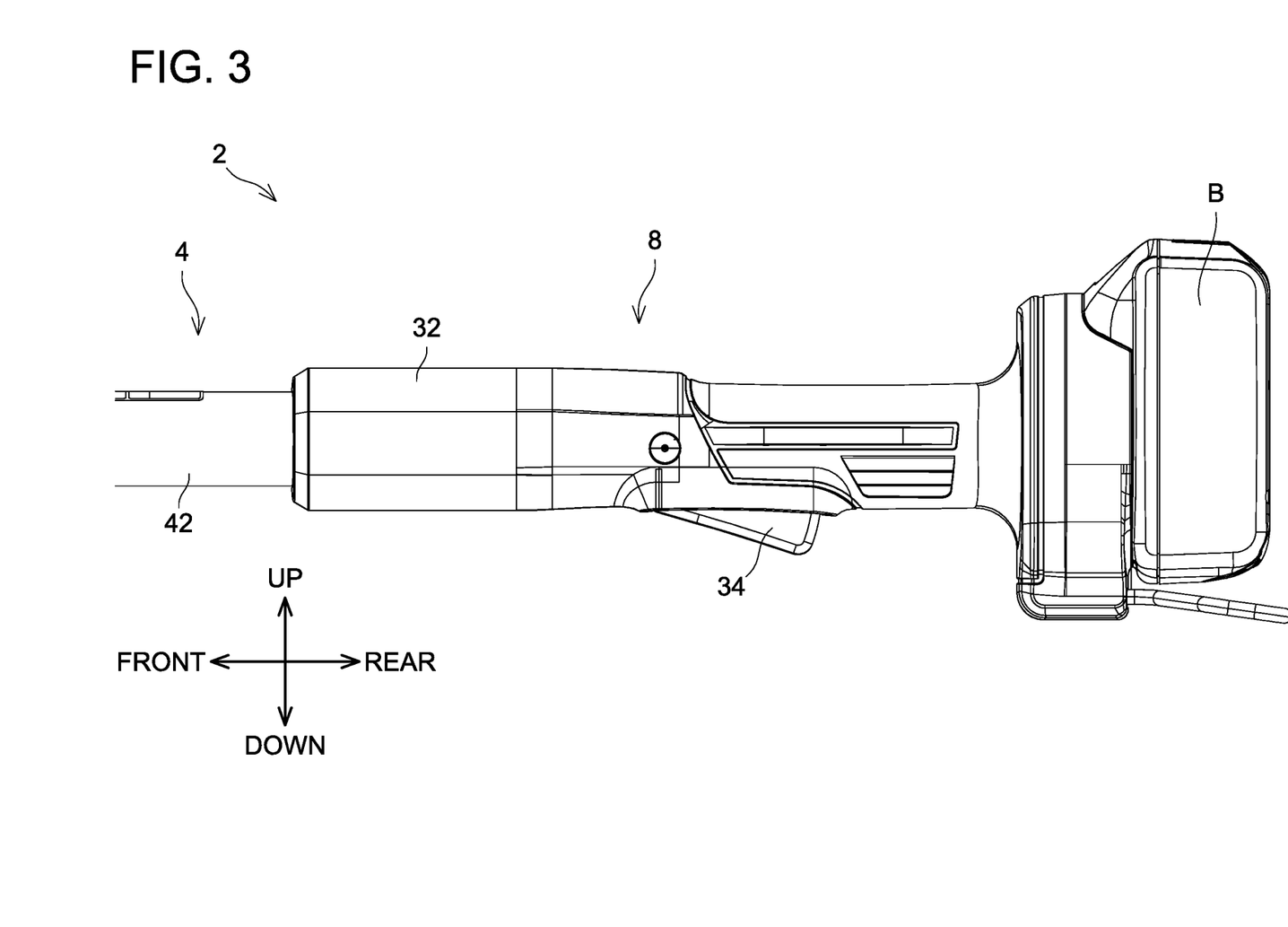
FIG. 3 is a side view seeing a vicinity of a rear end unit 8 of the working machine 2 of the embodiment from the left side.

As shown in FIG. 3, the rear end unit 8 comprises a rear end housing 32 and a trigger switch 34. The rear end housing 32 is attached to a rear end of the telescopic pipe 4. A battery pack B is detachably attached to a rear surface of the rear end housing 32. The trigger switch 34 is disposed on a lower surface of the rear end housing 32. The trigger switch 34 is configured to be operated by a worker.

As shown in FIG. 1, the telescopic pipe 4 has a handle 36 attached thereto. When using the working machine 2, the worker holds the working machine 2 by holding the rear end housing 32 with one hand and the handle 36 with the other hand. When the worker grips in the trigger switch 34 in this state, the motor 18 rotates and the pair of cutter blades 26 reciprocates. By bringing the blade edges 28 close to branches in higher spaces, for example, in this state where the pair of cutter blades 26 is reciprocating, the worker can prune the branches in the higher spaces.

Figure 4:
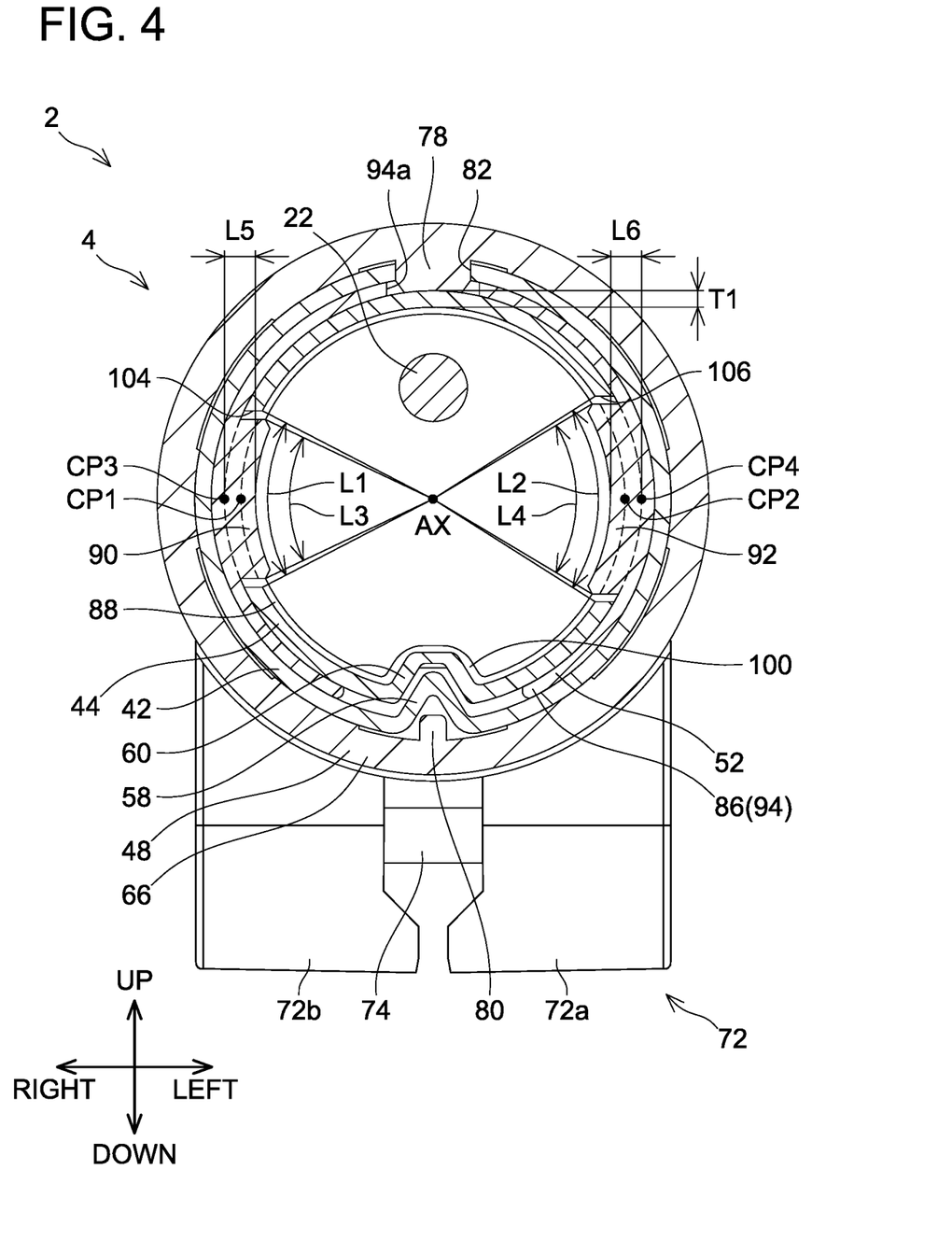
FIG. 4 is a cross-sectional view of a vicinity of a pipe holder 48 of the working machine 2 of the embodiment sectioned along a plane orthogonal to a front-rear direction.

The telescopic pipe 4 comprises a first pipe 42, a second pipe 44, a third pipe 46, and two pipe holders 48, 50. The first pipe 42, the second pipe 44, and the third pipe 46 are elongate circular pipe members extending in the front-rear direction. The power cable 22 (see FIG. 2) extends within the first pipe 42, the second pipe 44, and the third pipe 46. A rear end of the first pipe 42 is inserted into the rear end housing 32 from a front side. As shown in FIG. 4, the first pipe 42 includes a first rail part 58 at its lower portion. The first rail part 58 is recessed inward along a radial direction of the first pipe 42. The first rail part 58 extends in the front-rear direction.

As shown in FIG. 1, the second pipe 44 is inserted in the first pipe 42. A length of the telescopic pipe 4 changes by the second pipe 44 moving with respect to the first pipe 42 in the front-rear direction. As shown in FIG. 4, a diameter of an outer circumferential surface of the second pipe 44 is smaller than a diameter of an inner circumferential surface of the first pipe 42. The second pipe 44 includes a second rail part 60 at its lower portion. The second rail part 60 is recessed inward along a radial direction of the second pipe 44. The second rail part 60 extends in the front-rear direction. The second rail part 60 receives the first rail part 58 in a state where the second pipe 44 is inserted in the first pipe 42. Due to this, the second pipe 44 can be suppressed from rotating relative to the first pipe 42.

As shown in FIG. 1, the third pipe 46 is inserted in the second pipe 44. A front end of the third pipe 46 is inserted into the front end housing 10. The length of the telescopic pipe 4 changes by the third pipe 46 moving with respect to the second pipe 44 in the front-rear direction. A diameter of an outer circumferential surface of the third pipe 46 is smaller than a diameter of an inner circumferential surface of the second pipe 44. The third pipe 46 is recessed inward along a radial direction of the third pipe 46, and includes a third rail part (not shown) configured to receive the second rail part 60 in a state where the third pipe 46 is inserted in the second pipe 44. Due to this, the third pipe 46 can be suppressed from rotating relative to the second pipe 44.

Figure 5:
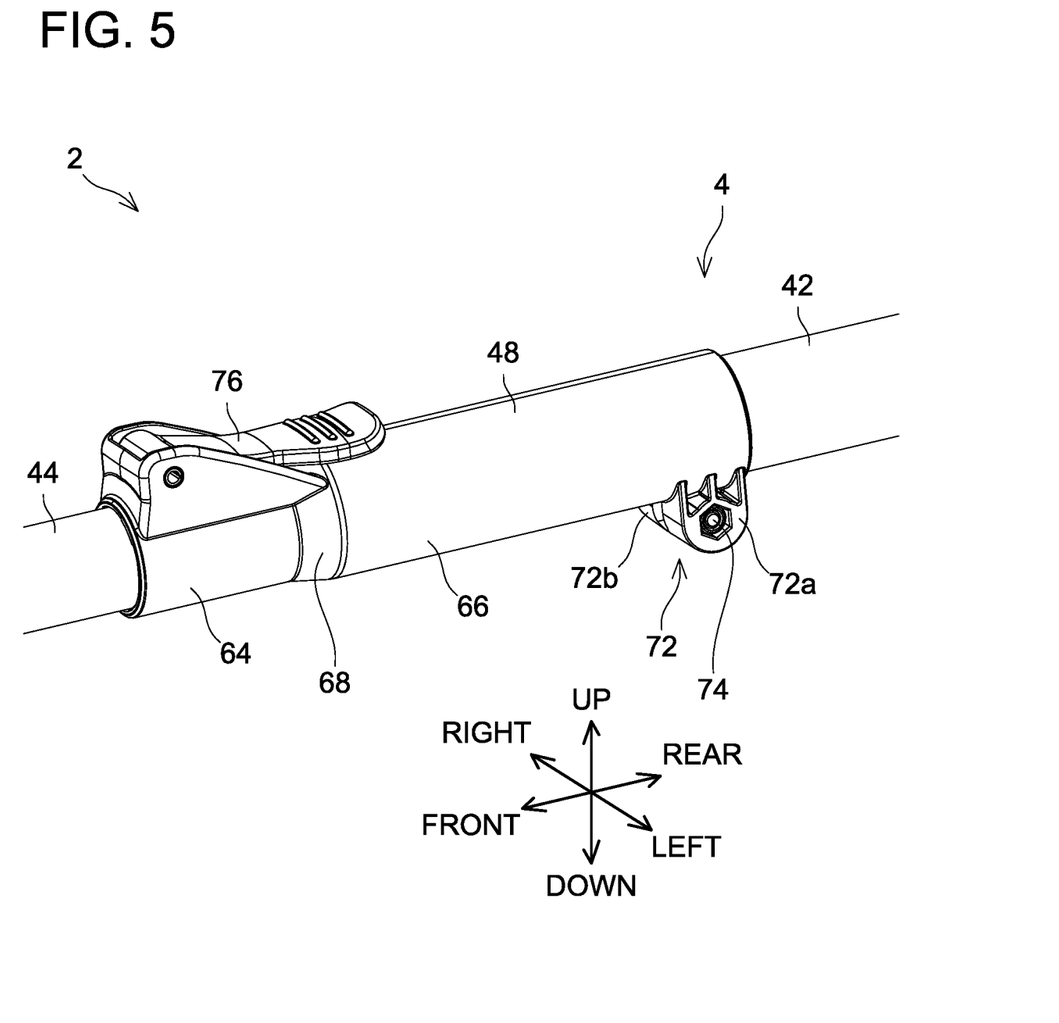
FIG. 5 is a perspective view of the vicinity of the pipe holder 48 of the working machine 2 of the embodiment.
Figure 6:
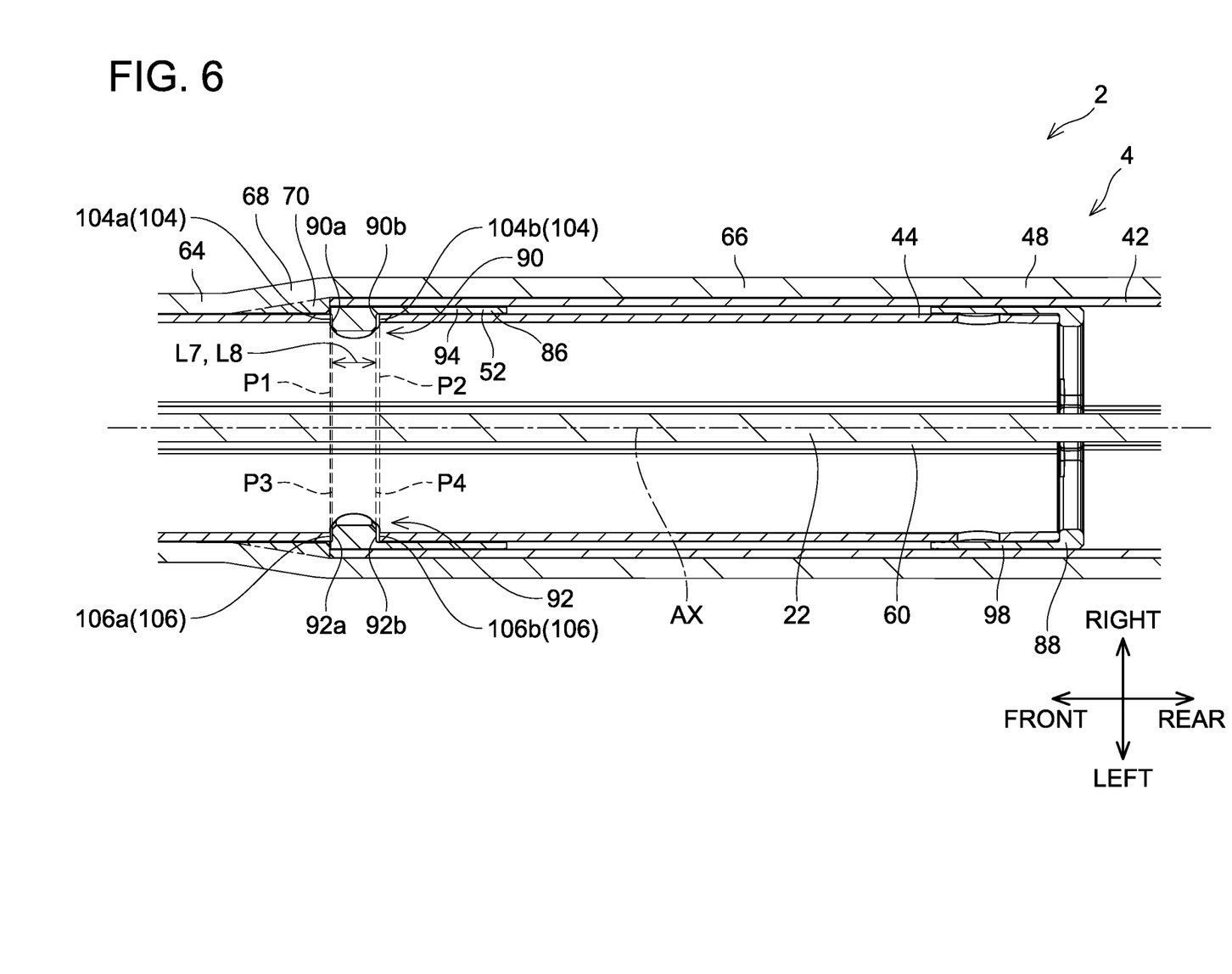
FIG. 6 is a cross-sectional view of the vicinity of the pipe holder 48 of the working machine 2 of the embodiment sectioned along a plane orthogonal to an up-down direction.

The pipe holder 48 is attached to a front end of the first pipe 42, and the pipe holder 50 is attached to a front end of the second pipe 44. A position where the pipe holder 48 is attached differs from a position where the pipe holder 50 is attached, however, since the pipe holders 48, 50 have a common basic configuration, the basic configuration of the pipe holder 48 will be described below. As shown in FIG. 5, the pipe holder 48 comprises a first pipe part 64, a second pipe part 66, a transitioning part 68, a wall part 70 (see FIG. 6), and a fixing part 72. The first pipe part 64 and the second pipe part 66 each have a cylindrical shape. As shown in FIG. 6, a diameter of an inner circumferential surface of the first pipe part 64 is larger than the diameter of the outer circumferential surface of the second pipe 44 and smaller than a diameter of an outer circumferential surface of the first pipe 42. Due to this, only the second pipe 44 is inserted in the first pipe part 64. As shown in FIG. 5, a lever 76 is attached to the first pipe part 64. In a state where the lever 76 is down, the telescopic pipe 4 cannot adjust its length since the second pipe 44 cannot move in the front-rear direction with respect to the first pipe 42. On the other hand, in a state where the lever 76 is lifted up, the telescopic pipe 4 can adjust its length since the second pipe 44 can move in the front-rear direction with respect to the first pipe 42.

As shown in FIG. 6, a diameter of an inner circumferential surface of the second pipe part 66 is larger than the diameter of the outer circumferential surface of each of the first pipe 42 and the second pipe 44. Due to this, both the first pipe 42 and the second pipe 44 are inserted in the second pipe part 66. As shown in FIG. 4, positioning parts 78, 80 are provided on the inner circumferential surface of the second pipe part 66. The positioning part 78 extends inward (which is downward in this embodiment) in a radial direction of the second pipe part 66 from an upper portion of the inner circumferential surface of the second pipe part 66. The positioning part 80 extends inward (which is upward in this embodiment) in the radial direction of the second pipe part 66 from a lower portion of the inner circumferential surface of the second pipe part 66. In a state where the pipe holder 48 is attached to the first pipe 42, the positioning part 78 fits in an opening 82 defined in the first pipe 42 and the positioning part 80 is received in the first rail part 58. Due to this, a position of the pipe holder 48 with respect to the first pipe 42 can easily be set.

As shown in FIG. 6, the transitioning part 68 connects the first pipe part 64 and the second pipe part 66. A diameter of an inner circumferential surface of the transitioning part 68 gradually increases from the first pipe part 64 toward the second pipe part 66. In FIG. 6, the inner circumferential surface of the transitioning part 68 is shown by one-dot chain line. The wall part 70 extends inward in a radial direction of the transitioning part 68 from the inner circumferential surface of the transitioning part 68 to a position corresponding to the inner circumferential surface of the first pipe part 64. The wall part 70 extends intermittently in a circumferential direction of the inner circumferential surface of the transitioning part 68. That is, the wall part 70 is partially discontinued in the circumferential direction of the inner circumferential surface of the transitioning part 68. The wall part 70 extends inward in the radial direction of the first pipe 42 with respect to the inner circumferential surface of the first pipe 42. Due to this, a front end surface of the first pipe 42 abuts a rear end surface of the wall part 70 from behind.

As shown in FIG. 5, the fixing part 72 is disposed at a rear lower portion of the second pipe part 66. The fixing part 72 comprises a left fixing part 72a and a right fixing part 72b. The left fixing part 72a and the right fixing part 72b are spaced apart from each other in the left-right direction. When a screw 74 is tightened in a direction by which the left fixing part 72a and the right fixing part 72b approach each other, the pipe holder 48 is thereby fixed to the first pipe 42.

Figure 7:
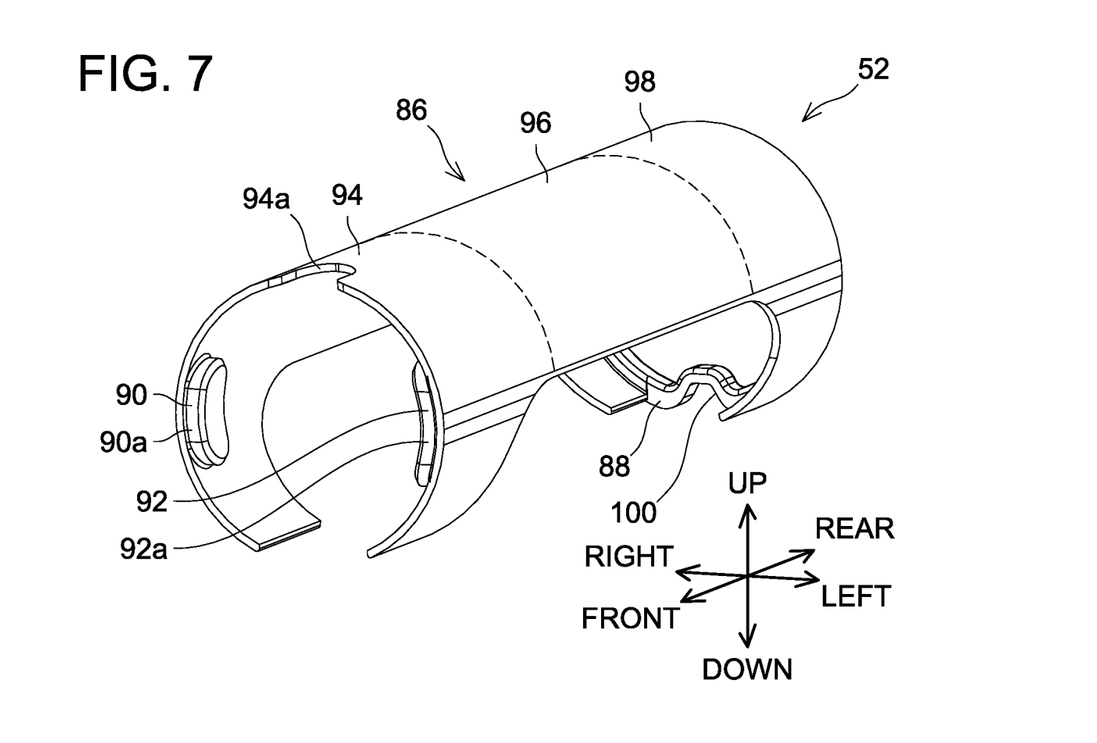
FIG. 7 is a perspective view of a stopper 52 of the working machine 2 of the embodiment.

As shown in FIG. 6, the telescopic pipe 4 further comprises a stopper 52. The stopper 52 is fixed to the second pipe 44. Further, another stopper (omitted from drawings) having a same basic configuration as the stopper 52 is fixed to the third pipe 46. Hereinbelow, the basic configuration of the stopper 52 will be described. The stopper 52 is disposed inside the first pipe 42. As shown in FIG. 7, the stopper 52 comprises a base 86, a covering 88, and a plurality of (two in the present embodiment) protruding parts 90, 92. As shown in FIG. 6, the base 86 is disposed between the inner circumferential surface of the first pipe 42 and the outer circumferential surface of the second pipe 44. As shown in FIG. 7, the base 86 has a substantially cylindrical shape having an area discontinued in the circumferential direction. The base 86 comprises an abutting part 94, a connecting part 96, and a supporting part 98. In FIG. 7, a boundary between the abutting part 94 and the connecting part 96 and a boundary between the connecting part 96 and the supporting part 98 are shown by broken lines.

A cross section of the abutting part 94 is in a substantially C shape. As shown in FIG. 6, a front surface of the abutting part 94 comes to abut the rear end surface of the wall part 70 of the pipe holder 48 from behind when the second pipe 44 extends to a maximum length relative to the first pipe 42. Due to this, the second pipe 44 is suppressed from detaching from the first pipe 42.

As shown in FIG. 7, a recess 94a that is recessed rearward is defined in an upper portion of a front end of the abutting part 94. As shown in FIG. 4, when the second pipe 44 extends to its maximum length relative to the first pipe 42, the positioning part 78 of the pipe holder 48 is received by the recess 94a. Due to this, the abutting part 94 is suppressed from interfering with the pipe holder 48.

As shown in FIG. 7, the connecting part 96 connects the abutting part 94 and the supporting part 98. A diameter of an outer circumferential surface of the connecting part 96 is equal to a diameter of an outer circumferential surface of the abutting part 94. A length of the outer circumferential surface of the connecting part 96 in the circumferential direction is shorter than a length of the outer circumferential surface of the abutting part 94 in the circumferential direction. A cross section of the supporting part 98 is in a substantially C shape. The supporting part 98 is configured to support the covering 88.

The covering 88 is disposed on a rear surface of the supporting part 98. The covering 88 has a substantially circular ring shape. A diameter of an outer circumferential surface of the covering 88 is equal to a diameter of an outer circumferential surface of the base 86. As shown in FIG. 6, a diameter of an inner circumferential surface of the covering 88 is smaller than a diameter of the inner circumferential surface of the second pipe 44. That is, the covering 88 extends inward in the radial direction of the second pipe 44 with respect to the inner circumferential surface of the second pipe 44. In a state where the stopper 52 is fixed to the second pipe 44, the covering 88 covers a rear end surface of the second pipe 44 by abutting the rear end surface of the second pipe 44 from behind. Due to this, the power cable 22 is suppressed from being damaged due to contacting the rear end surface of the second pipe 44.

Further, as shown in FIG. 7, the covering 88 incudes a fourth rail part 100 at its lower portion. The fourth rail part 100 is configured to receive the first rail part 58. Due to this, movement of the second pipe 44 relative to the first pipe 42 in the front-rear direction being hindered by the covering 88 interfering with the first rail part 58 is suppressed.

Figure 8:
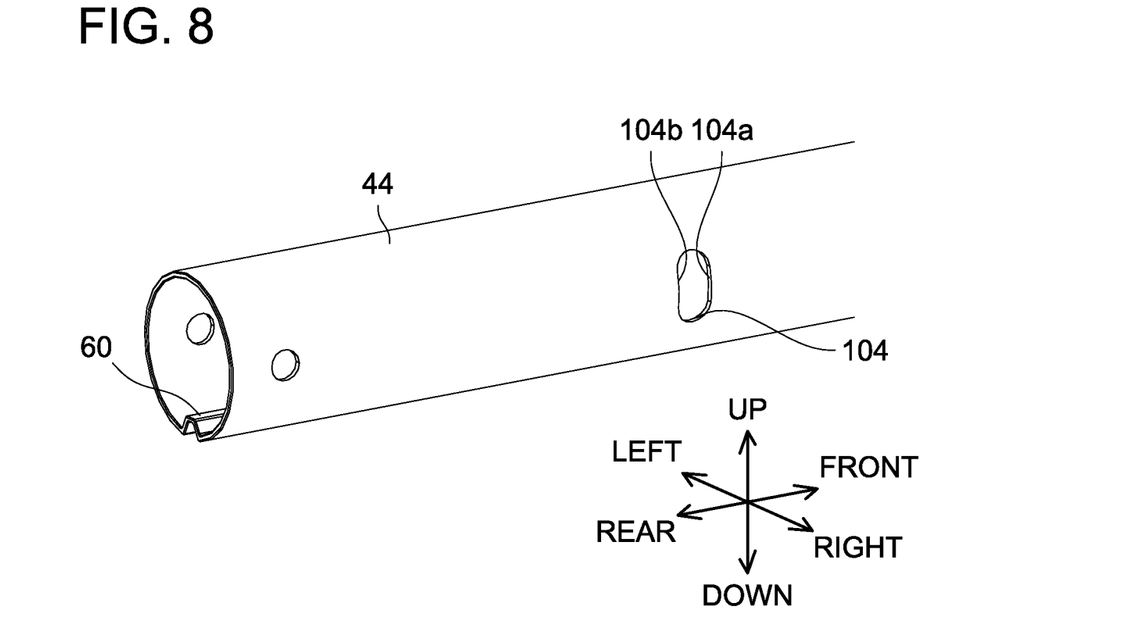
FIG. 8 is a perspective view of a vicinity of a rear end of a second pipe 44 of the working machine 2 of the embodiment.

As shown in FIG. 4, in the state where the stopper 52 is fixed to the second pipe 44, each of the protruding parts 90, 92 fits in its corresponding one of fixing holes 104, 106 defined in the second pipe 44. Hereinbelow, prior to explaining the configuration of the protruding parts 90, 92, the configuration of the fixing holes 104, 106 will be described first. As shown in FIG. 8, the fixing hole 104 is an elongate hole having its longitudinal direction along the circumferential direction of the outer circumferential surface of the second pipe 44. The fixing hole 104 is disposed near a rear end of the second pipe 44. The fixing hole 104 penetrates the second pipe 44 from the outer circumferential surface thereof to the inner circumferential surface thereof. Although omitted in FIG. 8, the fixing hole 106 has the same configuration as the fixing hole 104. That is, the fixing hole 106 (see FIG. 4) is an elongate hole having its longitudinal direction along the circumferential direction of the outer circumferential surface of the second pipe 44.

As shown in FIG. 4, the fixing hole 104 is disposed on the right side of the second pipe 44 and the fixing hole 106 is disposed on the left side of the second pipe 44. In a circumferential direction of the inner circumferential surface of the second pipe 44, an intermediate position CP1 of the fixing hole 104 in the longitudinal direction is set with a 180 degrees interval from an intermediate position CP2 of the fixing hole 106 in the longitudinal direction. That is, the intermediate position CP1 of the fixing hole 104 and the intermediate position CP2 of the fixing hole 106 are disposed at symmetrical positions with respect to a center axis AX of the second pipe 44 extending in the front-rear direction. In FIG. 4, the inner circumferential surface of the second pipe 44 is shown by one-dot chain line. In the circumferential direction of the inner circumferential surface of the second pipe 44, a length L1 of the fixing hole 104 is shorter than a length L2 of the fixing hole 106. A total length of the lengths L1 and L2 is designed to range from 20% to 50% of an entire circumference of the inner circumferential surface of the second pipe 44. In FIG. 4, lines indicating the lengths L1, L2 are depicted at positions slightly offset to a center axis AX side for easier view of the drawing.

As shown in FIG. 6, a front surface 104a of the fixing hole 104 has a shape extending along (conforming to) a plane P1 orthogonal to the front-rear direction. A rear surface 104b of the fixing hole 104 has a shape extending along (conforming to) a plane P2 orthogonal to the front-rear direction. The front surface 104a of the fixing hole 104 is parallel to the rear surface 104b of the fixing hole 104. Further, the front surface 106a of the fixing hole 106 has a shape extending along (conforming to) the plane P1, and a rear surface 106b of the fixing hole 106 has a shape extending along (conforming to) the plane P2. The front surface 106a of the fixing hole 106 is parallel to the rear surface 106b of the fixing hole 106. In the front-rear direction, a length from the front surface 104a to the rear surface 104b of the fixing hole 104 is equal to a length from the front surface 106a to the rear surface 106b of the fixing hole 106.

Next, the protruding parts 90, 92 will be described. The protruding parts 90, 92 are disposed at the front end of the abutting part 94. As shown in FIG. 4, the protruding parts 90, 92 extend inward in a radial direction of the abutting part 94 from an inner circumferential surface of the abutting part 94. In FIG. 4, the inner circumferential surface of the abutting part 94 is shown by broken lines. In the state where the stopper 52 is fixed to the second pipe 44, the protruding parts 90, 92 extend inward in the radial direction of the second pipe 44 with respect to the inner circumferential surface of the second pipe 44. That is, in the radial direction, a length L5 of the protruding part 90 and a length L6 of the protruding part 92 are each greater than a thickness T1 of the second pipe 44. In the present embodiment, the length L5 of the protruding part 90 is equal to the length L6 of the protruding part 92.

The protruding parts 90, 92 are elongate protrusions having their longitudinal direction in a circumferential direction of the inner circumferential surface of the abutting part 94. In the circumferential direction of the inner circumferential surface of the abutting part 94, an intermediate position CP3 of the protruding part 90 in the longitudinal direction is set with a 180 degrees interval from an intermediate position CP4 of the protruding part 92 in the longitudinal direction. That is, the intermediate position CP3 of the protruding part 90 and the intermediate position CP4 of the protruding part 92 are disposed at symmetrical positions with respect to a center axis AX of the abutting part 94. The center axis AX of the abutting part 94 coincides with the center axis AX of the second pipe 44. In the circumferential direction of the inner circumferential surface of the second pipe 44, a length L3 of the protruding part 90 is shorter than a length L4 of the protruding part 92. The length L3 of the protruding part 90 is slightly shorter than the length L1 of the fixing hole 104. Further, a length L4 of the protruding part 92 is slightly shorter than the length L2 of the fixing hole 106 and longer than the length L1 of the fixing hole 104. Due to this, even when the protruding part 90 is fitted in the fixing hole 106, the protruding part 92 cannot be fitted in the fixing hole 104 and thus the stopper 52 can be suppressed from being fixed to the second pipe 44 in an incorrect orientation.

A total length of the length L3 of the protruding part 90 and the length L4 of the protruding part 92 is designed to range from 20% to 50% of the entire circumference of the inner circumferential surface of the second pipe 44, and is set at 30% in the present embodiment. If the total length of the lengths L3 and L4 is less than 20% of the entire circumference of the inner circumferential surface of the second pipe 44, strength of the protruding parts 90, 92 is insufficient such that the protruding parts 90, 92 may be damaged when the abutting part 94 of the stopper 52 repeatedly abuts the wall part 70 of the pipe holder 48. Further, if the total length of the lengths L3 and L4 exceeds 50% of the entire circumference of the inner circumferential surface of the second pipe 44, the total length of the lengths L1, L2 of the fixing holes 104, 106 needs to be designed accordingly longer, by which strength of the second pipe 44 may become insufficient. When the total length of the lengths L3 and L4 is designed to range from 25% to 40% of the entire circumference of the inner circumferential surface of the second pipe 44, the strengths of both the protruding parts 90, 92 and the second pipe 44 can further be increased. In FIG. 4, lines indicating the lengths L3, L4 are depicted at positions slightly offset to the center axis AX side for easier view of the drawing.

As shown in FIG. 6, a front surface 90a of the protruding part 90 has a shape extending along (conforming to) a plane P3 orthogonal to the front-rear direction. The plane P3 is parallel to the plane P1 and is located slightly rearward with respect to the plane P1. Due to this, the front surface 90a of the protruding part 90 faces the front surface 104a of the fixing hole 104 in parallel therewith. A rear surface 90b of the protruding part 90 has a shape extending along (conforming to) a plane P4 orthogonal to the front-rear direction. The plane P4 is parallel to the plane P2 and is located slightly frontward with respect to the plane P2. Due to this, the rear surface 90b of the protruding part 90 faces the rear surface 104b of the fixing hole 104 in parallel therewith. Further, the rear surface 90b of the protruding part 90 is also parallel to the front surface 90a of the protruding part 90. In the front-rear direction, a length L7 from the front surface 90a to the rear surface 90b of the protruding part 90 is slightly shorter than the length from the front surface 104a to the rear surface 104b of the fixing hole 104. The length L5 of the protruding part 90 (see FIG. 4) is designed to range from 25% to 45% of the length L7, and is 35% in the present embodiment. If the length L5 is less than 25% of the length L7 or exceeds 45% of the length L7, size increase in the stopper 52 caused by size increase in the protruding part 90 cannot be suppressed while ensuring the strength of the protruding part 90. When the length L5 is designed to range from 30% to 40% of the length L7, the size increase in the stopper 52 can further be suppressed while ensuring high strength of the protruding part 90.

A front surface 92a of the protruding part 92 has a shape extending along (conforming to) the plane P3. The front surface 92a of the protruding part 92 faces the front surface 106a of the fixing hole 106 in parallel therewith. Further, a rear surface 92b of the protruding part 92 has a shape extending along (conforming to) the plane P4. The rear surface 92b of the protruding part 92 faces the rear surface 106b of the fixing hole 106 in parallel therewith. In the front-rear direction, a length L8 from the front surface 92a to the rear surface 92b of the protruding part 92 is slightly shorter than the length from the front surface 106a to the rear surface 106b of the fixing hole 106. The length L8 of the protruding part 92 is equal to the length L7 of the protruding part 90, and further, the length L6 of the protruding part 92 shown in FIG. 4 is equal to the length L5 of the protruding part 90, thus a relationship between the lengths L8 and L6 is same as a relationship between the lengths L7 and L5.

Next, force applied to the stopper 52 when the second pipe 44 extends to its maximum length relative to the first pipe 42 will be described. As shown in FIG. 6, when the second pipe 44 extends to its maximum length relative to the first pipe 42, the front surface of the abutting part 94 of the stopper 52 comes to abut the rear end surface of the wall part 70 of the pipe holder 48 from behind. Due to this, the stopper 52 attempts to move rearward relative to the second pipe 44. The rear surface 90b of the protruding part 90 is pressed against the rear surface 104b of the fixing hole 104, and the rear surface 92b of the protruding part 92 is pressed against the rear surface 106b of the fixing hole 106. Since the rear surface 90b of the protruding part 90 is parallel to the rear surface 104b of the fixing hole 104, the rear surface 90b of the protruding part 90 abuts the second pipe 44 in surface contact. Force applied to the protruding part 90 is distributed over an entirety of the rear surface 90b of the protruding part 90 without being concentrated at a certain point on the rear surface 90b of the protruding part 90. Further, since the rear surface 92b of the protruding part 92 is parallel to the rear surface 106b of the fixing hole 106, the rear surface 92b of the protruding part 92 also abuts the second pipe 44 in surface contact. Force applied to the protruding part 92 is also distributed over an entirety of the rear surface 92b of the protruding part 92 without being concentrated at a certain point on the rear surface 92b of the protruding part 92. Due to this, the protruding parts 90, 92 can be suppressed from being damaged, and further, the stopper 52 can be suppressed from detaching from the second pipe 44 due to the protruding parts 90, 92 riding over the outer circumferential surface of the second pipe 44. Moreover, due to damages to the protruding parts 90, 92 being suppressed, a thickness of the base 86 of the stopper 52 can be made thin, by which a diameter of the telescopic pipe 4 can be reduced.

(Effect)

The working machine 2 of the present embodiment comprises the telescopic pipe 4 configured to adjust its length in the front-rear direction; the front end unit 6 attached to the front end of the pipe 4 and including the working part 12; the rear end unit 8 attached to the rear end of the pipe 4; and the motor 18 configured to drive the working part 12. As shown in FIG. 6, the pipe 4 comprises: the first pipe 42; the second pipe 44 inserted in the first pipe 42; the pipe holder 48 fixed to the first pipe 42; and the stopper 52 disposed inside the first pipe 42. The pipe holder 48 comprises the wall part 70 extending inward in the radial direction with respect to the inner circumferential surface of the first pipe 42. The second pipe 44 includes the fixing holes 104, 106 each having the longitudinal direction in the circumferential direction of the outer circumferential surface of the second pipe 44. Each of the rear surfaces 104b, 106b of the fixing holes 104, 106 has the shape extending along (conforming to) the plane P2 orthogonal to the front-rear direction. The stopper 52 comprises: the abutting part 94 disposed rearward with respect to the wall part 70 and configured to abut the wall part 70 from behind when the second pipe 44 extends to the maximum length relative to the first pipe 42; and the protruding parts 90, 92 extending inward in the radial direction from outside with respect to the outer circumferential surface of the second pipe 44 and configured to fit in respectively the fixing holes 104, 106 of the second pipe 44. Each of the rear surfaces 90b, 92b of the protruding parts 90, 92 has the shape extending along (conforming to) the plane P4 parallel to the rear surfaces 104b, 106b of the fixing holes 104, 106.

According to the above configuration, when the second pipe 44 extends to the maximum length relative to the first pipe 42 and the abutting part 94 of the stopper 52 thereby abuts the wall part 70 of the pipe holder 48, the protruding parts 90, 92 each attempts to move rearward relative to the second pipe 44 and thus each of the rear surfaces 90b, 92b of the protruding parts 90, 92 is pressed against the corresponding one of the rear surfaces 104b, 106b of the fixing holes 104, 106. Since each of the rear surfaces 90b, 92b of the protruding parts 90, 92 has the shape extending along the plane P3 parallel to the corresponding one of the rear surfaces 104b, 106b of the fixing holes 104, 106, each of the rear surfaces 90b, 92b of the protruding parts 90, 92 abuts the second pipe 44 in surface contact. Due to this, force applied to the protruding parts 90, 92 does not concentrate at a certain point of the rear surfaces 90b, 92b of the protruding parts 90, 92 but is rather distributed over an entirety of each of the rear surfaces 90b, 92b of the protruding parts 90, 92. Due to this, even when the abutting part 94 repeatedly abuts the wall part 70 as a result of extension and retraction of the telescopic pipe 4, the protruding parts 90, 92 can be suppressed from being damaged, and fixation of the stopper 52 to the second pipe 44 can be ensured.

The length L3+L4 of the protruding parts 90, 92 in the circumferential direction on the inner circumferential surface of the second pipe 44 ranges from twenty percent to fifty percent of the entire circumference of the inner circumferential surface of the second pipe 44.

If the length L3+L4 of the protruding parts 90, 92 in the circumferential direction is less than 20% of the entire circumference of the inner circumferential surface of the second pipe 44, strength of the protruding parts 90, 92 might be insufficient such that the protruding parts 90, 92 may be damaged when the abutting part 94 repeatedly abuts the wall part 70, as a result of which the stopper 52 might become incapable of being fixed to the second pipe 44. Further, if the length L3+L4 of the protruding parts 90, 92 in the circumferential direction is more than 50% of the entire circumference of the inner circumferential surface of the second pipe 44, the fixing holes 104, 106 must be designed to correspond to the length of the protruding parts 90, 92, as a result of which strength of the second pipe 44 might become insufficient. According to the above configuration, the stopper 52 becoming incapable of being fixed to the second pipe 44 due to the protruding parts 90, 92 being damaged can be suppressed, and the strength of the second pipe 44 can be suppressed from being insufficient.

As shown in FIG. 4, each of the fixing holes 104, 106 penetrates the second pipe 44 from the outer circumferential surface to the inner circumferential surface of the second pipe 44. In the state of fitting in the corresponding one of the fixing holes 104, 106, each of the protruding parts 90, 92 extends inward in the radial direction with respect to the inner circumferential surface of the second pipe 44.

According to the above configuration, a contacting area where each of the protruding parts 90, 92 contacts the second pipe 44 can be increased as compared to a case where each of the protruding parts 90, 92 does not extend inward in the radial direction with respect to the inner circumferential surface of the second pipe 44. Due to this, force applied to each of the protruding parts 90, 92 can further be distributed. Even if the abutting part 94 repeatedly abuts the wall part 70, each of the protruding parts 90, 92 can be suppressed from being damaged and the stopper 52 can be ensured to be fixed to the second pipe 44.

The stopper 52 comprises at least two protruding parts 90, 92, and two of the at least two protruding parts 90, 92 are disposed at symmetrical positions with respect to the center axis AX of the second pipe 44 when viewed in the plane orthogonal to the front-rear direction.

According to the above configuration, when the abutting part 94 of the stopper 52 abuts the wall part 70 of the pipe holder 48 with the second pipe 44 extended to its maximum length relative to the first pipe 42, the force is applied uniformly over the two protruding parts 90, 92 rather than excessive force being applied to only one of the two protruding parts 90, 92. Due to this, even if the abutting part 94 repeatedly abuts the wall part 70, the protruding parts 90, 92 can be suppressed from being damaged and the stopper 52 can be ensured to be fixed to the second pipe 44.

As shown in FIG. 6, the stopper 52 covers the rear end surface of the second pipe 44.

In general, another member such as the power cable 22 may be disposed inside the telescopic pipe 4. According to the above configuration, with the stopper 52 covering the rear end surface of the second pipe 44, this other member such as the power cable 22 can be suppressed from contacting and being damaged by the rear end surface of the second pipe 44.

The length L5, L6 of the protruding parts 90, 92 in the radial direction ranges from twenty-five percent to forty-five percent of the length L7, L8 of the protruding parts 90, 92 in the front-rear direction.

According to the above configuration, the size of the stopper 52 can be suppressed from becoming large-sized accompanying a size increase of the protruding parts 90, 92 while the strength of the protruding parts 90, 92 is ensured.

The motor 18 functions as a prime mover.

When the prime mover is an engine, the telescopic pipe 4 vibrates due to vibration of the engine. If the telescopic pipe 4 vibrates in the state where the second pipe 44 is extended to its maximum length relative to the first pipe 42 and the abutting part 94 is abutting the wall part 70, large force would continue to be applied to each of the protruding parts 90, 92, as a result of which the protruding parts 90, 92 might thereby be damaged. According to the above configuration, the vibration of the telescopic pipe 4 is suppressed as compared to the case where the prime mover is an engine. Even if the telescopic pipe 4 vibrates while the abutting part 94 abuts the wall part 70, the large force continuing to be applied to the protruding parts 90, 92 can be suppressed from occurring. Due to this, the protruding parts 90, 92 can be suppressed from being damaged, and fixation of the stopper 52 to the second pipe 44 can be ensured.

The working machine 2 further comprises the battery pack B configured to be detachably attached to the rear end unit 8. The motor 18 is configured to be driven by power supplied from the battery pack B.

With the configuration in which the working machine 2 supplies power to the motor 18 from an external power source through a power cable, the power cable could hinder work that is to be performed. According to the above configuration, workability in using the working machine 2 can be improved.

(Corresponding Relationship)

The first pipe 42 is an example of "outer pipe". In this case, the second pipe 44 is an example of "inner pipe". Further, the second pipe 44 is also an example of the "outer pipe". In this case, the third pipe 46 is an example of the "inner pipe".

The stopper 52 according to an embodiment may comprise one protruding part, or may comprise three or more protruding parts.

In the working machine 2 according to an embodiment, the length L1 of the fixing hole 104 may be equal to the length L2 of the fixing hole 106. Further, the length L3 of the protruding part 90 may be equal to the length L4 of the protruding part 92.

The protruding parts 90, 92 according to an embodiment may not be disposed at symmetrical positions with respect to the center axis AX of the abutting part 94.

The protruding parts 90, 92 according to an embodiment may not extend inward in the radial direction with respect to the inner circumferential surface of the second pipe 44. For example, the lengths L5, L6 of the protruding parts 90, 92 may be designed to range from 50% to 100% of the thickness T1 of the second pipe 44.

The working machine 2 according to an embodiment may be an engine-driven working machine.

The working machine 2 according to an embodiment may be a pole saw, a trimmer, a mower, a pruner, or a rotary mop.

The working machine 2 according to an embodiment may not comprise the battery pack B. In this case, the working machine 2 may be configured to supply power to the motor 18 through a power cable from an external power source.

In the working machine 2 according to an embodiment, the motor 18 may be disposed inside the rear end housing 32. In this case, a drive shaft may extend within the first pipe 42, the second pipe 44, and the third pipe 46. The drive shaft may be connected to the power conversion mechanism 20.

What is claimed is:

1. A working machine, comprising:
   a telescopic pipe configured to adjust its length in a front-rear direction;
   a front end unit attached to a front end of the pipe and including a working part;
   a rear end unit attached to a rear end of the pipe; and
   a prime mover configured to drive the working part, wherein
   the pipe comprises:
      an outer pipe;
      an inner pipe inserted in the outer pipe;
      a pipe holder fixed to the outer pipe; and
      a stopper disposed inside the outer pipe,
   the pipe holder comprises a wall part extending inward in a radial direction with respect to an inner circumferential surface of the outer pipe,
   the inner pipe includes a fixing hole having a longitudinal direction in a circumferential direction of an outer circumferential surface of the inner pipe,
   a rear surface of the fixing hole has a shape extending along a plane orthogonal to the front-rear direction,
   the stopper comprises:
      an abutting part disposed rearward with respect to the wall part and configured to abut the wall part from behind when the inner pipe extends to a maximum length relative to the outer pipe; and
      a protruding part extending inward in the radial direction from outside with respect to the outer circumferential surface of the inner pipe and configured to fit in the fixing hole of the inner pipe, and
   a rear surface of the protruding part has a shape extending along a plane parallel to the rear surface of the fixing hole.

2. The working machine according claim 1, wherein a length of the protruding part in the circumferential direction on an inner circumferential surface of the inner pipe ranges from twenty percent to fifty percent of an entire circumference of the inner circumferential surface of the inner pipe.

3. The working machine according to claim 2, wherein the fixing hole penetrates the inner pipe from the outer circumferential surface to the inner circumferential surface of the inner pipe, in a state of fitting in the fixing hole, the protruding part extends inward in the radial direction with respect to the inner circumferential surface of the inner pipe, the protruding part comprises at least two protruding parts, two of the at least two protruding parts are disposed at symmetrical positions with respect to a center axis of the inner pipe when viewed in the plane orthogonal to the front-rear direction, the stopper covers a rear end surface of the inner pipe, a length of the protruding part in the radial direction ranges from twenty-five percent to forty-five percent of a length of the protruding part in the front-rear direction, the prime mover comprises a motor, the working machine further comprises a battery pack configured to be detachably attached to the rear end unit, and the motor is configured to be driven by power supplied from the battery pack.

4. The working machine according to claim 1, wherein the fixing hole penetrates the inner pipe from the outer circumferential surface to an inner circumferential surface of the inner pipe, and in a state of fitting in the fixing hole, the protruding part extends inward in the radial direction with respect to the inner circumferential surface of the inner pipe.

5. The working machine according to claim 1, wherein the protruding part comprises at least two protruding parts, and two of the at least two protruding parts are disposed at symmetrical positions with respect to a center axis of the inner pipe when viewed in the plane orthogonal to the front-rear direction.

6. The working machine according to claim 1, wherein the stopper covers a rear end surface of the inner pipe.

7. The working machine according to claim 1, wherein a length of the protruding part in the radial direction ranges from twenty-five percent to forty-five percent of a length of the protruding part in the front-rear direction.

8. The working machine according to claim 1, wherein the prime mover comprises a motor.

9. The working machine according to claim 8, further comprising a battery pack configured to be detachably attached to the rear end unit, wherein the motor is configured to be driven by power supplied from the battery pack.

\* \* \* \* \*